United States Patent
Alizadeh-Shabdiz et al.

(10) Patent No.: US 9,516,471 B2
(45) Date of Patent: *Dec. 6, 2016

(54) SYSTEM AND METHOD FOR ESTIMATING THE PROBABILITY OF MOVEMENT OF ACCESS POINTS IN A WLAN-BASED POSITIONING SYSTEM

(71) Applicant: Skyhook Wireless, Inc., Boston, MA (US)

(72) Inventors: Farshid Alizadeh-Shabdiz, Wayland, MA (US); Oleksiy Ignatyev, Brighton, MA (US)

(73) Assignee: SKYHOOK WIRELESS, INC., Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/144,988

(22) Filed: Dec. 31, 2013

(65) Prior Publication Data

US 2014/0187169 A1 Jul. 3, 2014

Related U.S. Application Data

(63) Continuation of application No. 12/760,780, filed on Apr. 15, 2010, now Pat. No. 8,619,643.

(Continued)

(51) Int. Cl.
*H04B 7/00* (2006.01)
*H04W 4/02* (2009.01)
(Continued)

(52) U.S. Cl.
CPC ............ *H04W 4/028* (2013.01); *G01S 5/0278* (2013.01); *G01S 5/0242* (2013.01); *H04W 24/10* (2013.01); *H04W 64/00* (2013.01); *H04W 84/12* (2013.01)

(58) Field of Classification Search
USPC ............ 370/310–350; 455/404.2, 456.1–457
See application file for complete search history.

(56) References Cited

U.S. PATENT DOCUMENTS 6,134,448 A  10/2000  Shoji et al.
6,246,884 B1  6/2001  Karmi et al.
(Continued)

FOREIGN PATENT DOCUMENTS

WO  WO-2004036240  4/2004
WO  WO-2007081356  7/2007
(Continued)

OTHER PUBLICATIONS

Zhou, Wireless Indoor Tracking System, Jul. 12, 2006.*
(Continued)

*Primary Examiner* — Ricky Ngo
*Assistant Examiner* — Wei-Po Kao
(74) *Attorney, Agent, or Firm* — Cesari and McKenna, LLP; James A. Blanchette

(57) ABSTRACT

Methods of and systems for estimating the probability of movement of access points in a WLAN-based positioning system are provided. Disclosed are methods to quantify the probability that a particular location estimate of a mobile device made by a Wi-Fi based positioning system is correct to within an arbitrary accuracy. Implementations use observed access point cluster size, age information for access point location determination, and/or the probability that one or more access points detected by the mobile device have relocated based on historic information about the movement of a collection of access points to make the probability determinations.

20 Claims, 8 Drawing Sheets

Related U.S. Application Data

(60) Provisional application No. 61/316,980, filed on Mar. 24, 2010.

(51) Int. Cl.
- *G01S 5/02* (2010.01)
- *H04W 24/10* (2009.01)
- *H04W 64/00* (2009.01)
- *H04W 84/12* (2009.01)

(56) References Cited

U.S. PATENT DOCUMENTS

| | | | |
|---|---|---|---|
| 6,272,405 B1 | 8/2001 | Kubota | |
| 6,393,294 B1 | 5/2002 | Perez-Breva et al. | |
| 6,438,491 B1 | 8/2002 | Farmer | |
| 6,674,403 B2* | 1/2004 | Gray et al. | 342/463 |
| 6,678,611 B2 | 1/2004 | Khavakh et al. | |
| 6,757,518 B2 | 6/2004 | Spratt et al. | |
| 6,789,102 B2 | 9/2004 | Gotou et al. | |
| 6,799,049 B1 | 9/2004 | Zellner et al. | |
| 6,862,524 B1 | 3/2005 | Nagda et al. | |
| 6,888,811 B2 | 5/2005 | Eaton et al. | |
| 6,915,123 B1 | 7/2005 | Daudelin et al. | |
| 6,946,950 B1 | 9/2005 | Ueno et al. | |
| 6,956,527 B2 | 10/2005 | Rogers et al. | |
| 6,978,023 B2 | 12/2005 | Dacosta | |
| 7,046,657 B2 | 5/2006 | Harrington et al. | |
| 7,123,928 B2 | 10/2006 | Moeglein et al. | |
| 7,167,715 B2 | 1/2007 | Stanforth | |
| 7,167,716 B2 | 1/2007 | Kim et al. | |
| 7,254,405 B2 | 8/2007 | Lin et al. | |
| 7,269,427 B2 | 9/2007 | Hoctor et al. | |
| 7,271,765 B2 | 9/2007 | Stilp et al. | |
| 7,305,245 B2 | 12/2007 | Alizadeh-Shabdiz et al. | |
| 7,333,816 B2 | 2/2008 | Filizola et al. | |
| 7,403,762 B2 | 7/2008 | Morgan et al. | |
| 7,414,988 B2 | 8/2008 | Jones et al. | |
| 7,417,961 B2 | 8/2008 | Lau | |
| 7,433,694 B2 | 10/2008 | Morgan et al. | |
| 7,471,954 B2 | 12/2008 | Brachet et al. | |
| 7,474,897 B2 | 1/2009 | Morgan et al. | |
| 7,493,127 B2 | 2/2009 | Morgan et al. | |
| 7,502,620 B2 | 3/2009 | Morgan et al. | |
| 7,515,578 B2 | 4/2009 | Alizadeh-Shabdiz et al. | |
| 7,551,579 B2 | 6/2009 | Alizadeh-Shabdiz et al. | |
| 7,551,929 B2 | 6/2009 | Alizadeh-Shabdiz et al. | |
| 7,616,965 B2 | 11/2009 | Rudravaram et al. | |
| 7,636,576 B1 | 12/2009 | Pfister et al. | |
| 7,706,814 B2 | 4/2010 | Sillasto et al. | |
| 7,768,963 B2 | 8/2010 | Alizadeh-Shabdiz | |
| 7,769,396 B2 | 8/2010 | Alizadeh-Shabdiz et al. | |
| 7,818,017 B2 | 10/2010 | Alizadeh-Shabdiz et al. | |
| 7,835,754 B2 | 11/2010 | Alizadeh-Shabdiz et al. | |
| 7,856,234 B2 | 12/2010 | Alizadeh-Shabdiz et al. | |
| 7,948,433 B2 | 5/2011 | Seatovic et al. | |
| 8,106,828 B1 | 1/2012 | Do et al. | |
| 8,130,148 B2 | 3/2012 | Alizadeh-Shabdiz | |
| 8,154,454 B2 | 4/2012 | Alizadeh-Shabdiz | |
| 8,155,673 B2 | 4/2012 | Alizadeh-Shabdiz et al. | |
| 8,244,272 B2 | 8/2012 | Morgan et al. | |
| 8,340,685 B2 | 12/2012 | Cochran et al. | |
| 2001/0022558 A1 | 9/2001 | Karr et al. | |
| 2002/0080063 A1 | 6/2002 | Bloebaum et al. | |
| 2002/0154056 A1 | 10/2002 | Gaal et al. | |
| 2002/0184331 A1 | 12/2002 | Blight et al. | |
| 2003/0069024 A1 | 4/2003 | Kennedy | |
| 2003/0087647 A1 | 5/2003 | Hurst | |
| 2003/0114206 A1 | 6/2003 | Timothy et al. | |
| 2003/0125045 A1 | 7/2003 | Riley et al. | |
| 2003/0146835 A1 | 8/2003 | Carter | |
| 2003/0225893 A1 | 12/2003 | Roese et al. | |
| 2004/0019679 A1 | 1/2004 | E et al. | |
| 2004/0039520 A1 | 2/2004 | Khavakh et al. | |
| 2004/0068364 A1 | 4/2004 | Zhao et al. | |
| 2004/0087317 A1 | 5/2004 | Caci | |
| 2004/0124977 A1 | 7/2004 | Biffar | |
| 2004/0162896 A1 | 8/2004 | Cen et al. | |
| 2004/0193367 A1 | 9/2004 | Cline | |
| 2004/0203904 A1 | 10/2004 | Gwon et al. | |
| 2004/0204063 A1 | 10/2004 | Van Erlach | |
| 2004/0205234 A1 | 10/2004 | Barrack et al. | |
| 2005/0020266 A1 | 1/2005 | Backes et al. | |
| 2005/0037775 A1 | 2/2005 | Moeglein et al. | |
| 2005/0055374 A1 | 3/2005 | Sato | |
| 2005/0192024 A1 | 9/2005 | Sheynblat | |
| 2005/0227711 A1 | 10/2005 | Orwant et al. | |
| 2005/0232189 A1 | 10/2005 | Loushine | |
| 2006/0009235 A1 | 1/2006 | Sheynblat et al. | |
| 2006/0058958 A1 | 3/2006 | Galbreath et al. | |
| 2006/0078122 A1 | 4/2006 | Dacosta | |
| 2006/0092015 A1 | 5/2006 | Agrawal et al. | |
| 2006/0128397 A1 | 6/2006 | Choti et al. | |
| 2006/0197704 A1 | 9/2006 | Luzzatto et al. | |
| 2006/0240840 A1 | 10/2006 | Morgan et al. | |
| 2006/0270421 A1 | 11/2006 | Phillips et al. | |
| 2006/0293064 A1* | 12/2006 | Robertson | H04W 64/006 455/456.1 |
| 2007/0004428 A1 | 1/2007 | Morgan et al. | |
| 2007/0110053 A1 | 5/2007 | Soni et al. | |
| 2007/0121560 A1 | 5/2007 | Edge | |
| 2007/0126635 A1 | 6/2007 | Houri | |
| 2007/0150516 A1 | 6/2007 | Morgan et al. | |
| 2007/0178911 A1 | 8/2007 | Baumeister et al. | |
| 2007/0184846 A1 | 8/2007 | Horton et al. | |
| 2007/0202888 A1 | 8/2007 | Brachet et al. | |
| 2007/0210961 A1 | 9/2007 | Romijn | |
| 2007/0232892 A1 | 10/2007 | Hirota | |
| 2007/0258420 A1 | 11/2007 | Alizadeh-Shabdiz et al. | |
| 2008/0008117 A1 | 1/2008 | Alizadeh-Shabdiz | |
| 2008/0008118 A1 | 1/2008 | Alizadeh-Shabdiz | |
| 2008/0008119 A1 | 1/2008 | Alizadeh-Shabdiz | |
| 2008/0008120 A1 | 1/2008 | Alizadeh-Shabdiz | |
| 2008/0008121 A1 | 1/2008 | Alizadeh-Shabdiz | |
| 2008/0033646 A1 | 2/2008 | Morgan et al. | |
| 2008/0045234 A1 | 2/2008 | Reed | |
| 2008/0108371 A1 | 5/2008 | Alizadeh-Shabdiz et al. | |
| 2008/0132170 A1* | 6/2008 | Alizadeh-Shabdiz et al. | 455/41.2 |
| 2008/0133124 A1 | 6/2008 | Sarkeshik | |
| 2008/0139219 A1 | 6/2008 | Boeiro et al. | |
| 2008/0176583 A1 | 7/2008 | Brachet et al. | |
| 2008/0188242 A1 | 8/2008 | Carlson et al. | |
| 2008/0248741 A1 | 10/2008 | Alizadeh-Shabdiz | |
| 2008/0248808 A1 | 10/2008 | Alizadeh-Shabdiz | |
| 2008/0261622 A1 | 10/2008 | Lee et al. | |
| 2008/0288493 A1 | 11/2008 | Yang et al. | |
| 2009/0075672 A1 | 3/2009 | Jones et al. | |
| 2009/0149197 A1 | 6/2009 | Morgan et al. | |
| 2009/0154371 A1 | 6/2009 | Alizadeh-Shabdiz et al. | |
| 2009/0175189 A1 | 7/2009 | Alizadeh-Shabdiz et al. | |
| 2009/0252138 A1 | 10/2009 | Alizadeh-Shabdiz et al. | |
| 2009/0286549 A1 | 11/2009 | Canon et al. | |
| 2009/0303112 A1 | 12/2009 | Alizadeh-Shabdiz | |
| 2009/0303113 A1 | 12/2009 | Alizadeh-Shabdiz | |
| 2009/0303114 A1 | 12/2009 | Alizadeh-Shabdiz | |
| 2009/0303115 A1 | 12/2009 | Alizadeh-Shabdiz | |
| 2009/0303119 A1 | 12/2009 | Alizadeh-Shabdiz | |
| 2009/0303120 A1 | 12/2009 | Alizadeh-Shabdiz | |
| 2009/0303121 A1 | 12/2009 | Alizadeh-Shabdiz | |
| 2009/0310585 A1 | 12/2009 | Alizadeh-Shabdiz | |
| 2009/0312035 A1 | 12/2009 | Alizadeh-Shabdiz | |
| 2009/0312036 A1 | 12/2009 | Alizadeh-Shabdiz | |
| 2010/0052983 A1 | 3/2010 | Alizadeh-Shabdiz | |
| 2011/0012780 A1 | 1/2011 | Alizadeh-Shabdiz | |
| 2011/0012784 A1 | 1/2011 | Alizadeh-Shabdiz | |
| 2011/0021207 A1 | 1/2011 | Morgan et al. | |
| 2011/0026506 A1* | 2/2011 | Macnaughtan et al. | 370/338 |
| 2011/0034179 A1 | 2/2011 | David et al. | |
| 2011/0035420 A1 | 2/2011 | Alizadeh-Shabdiz et al. | |
| 2011/0045840 A1 | 2/2011 | Alizadeh-Shabdiz et al. | |
| 2011/0058495 A1 | 3/2011 | Alizadeh-Shabdiz et al. | |
| 2011/0074626 A1 | 3/2011 | Alizadeh-Shabdiz et al. | |
| 2011/0080317 A1 | 4/2011 | Alizadeh-Shabdiz et al. | |

(56) References Cited

U.S. PATENT DOCUMENTS

| | | |
|---|---|---|
| 2011/0080318 A1 | 4/2011 | Alizadeh-Shabdiz et al. |
| 2011/0080841 A1 | 4/2011 | Alizadeh-Shabdiz et al. |
| 2011/0084881 A1 | 4/2011 | Fischer |
| 2011/0235532 A1 | 9/2011 | Alizadeh-Shabdiz et al. |
| 2011/0235623 A1 | 9/2011 | Alizadeh-Shabdiz et al. |
| 2011/0287783 A1 | 11/2011 | Alizadeh-Shabdiz et al. |
| 2011/0298660 A1 | 12/2011 | Alizadeh-Shabdiz |
| 2011/0298663 A1 | 12/2011 | Alizadeh-Shabdiz |
| 2011/0298664 A1 | 12/2011 | Alizadeh-Shabdiz |
| 2011/0306357 A1 | 12/2011 | Alizadeh-Shabdiz et al. |
| 2011/0306358 A1 | 12/2011 | Alizadeh-Shabdiz et al. |
| 2011/0306359 A1 | 12/2011 | Alizadeh-Shabdiz et al. |
| 2011/0306360 A1 | 12/2011 | Alizadeh-Shabdiz et al. |
| 2011/0306361 A1 | 12/2011 | Alizadeh-Shabdiz et al. |
| 2012/0007775 A1 | 1/2012 | Alizadeh-Shabdiz |
| 2012/0071175 A1 | 3/2012 | Skibiski et al. |
| 2012/0100872 A1 | 4/2012 | Alizadeh-Shabdiz et al. |
| 2012/0108260 A1 | 5/2012 | Alizadeh-Shabdiz |
| 2012/0112958 A1 | 5/2012 | Alizadeh-Shabdiz et al. |
| 2012/0178477 A1 | 7/2012 | Morgan et al. |
| 2012/0196621 A1 | 8/2012 | Alizadeh-Shabdiz et al. |
| 2012/0280866 A1 | 11/2012 | Alizadeh-Shabdiz |
| 2012/0284118 A1 | 11/2012 | Mamich, Jr. et al. |
| 2012/0309420 A1 | 12/2012 | Morgan et al. |
| 2013/0072227 A1 | 3/2013 | Morgan et al. |

FOREIGN PATENT DOCUMENTS

| | | |
|---|---|---|
| WO | WO-2007101107 | 9/2007 |
| WO | WO-2011119575 | 9/2011 |
| WO | WO-2011156549 | 12/2011 |

OTHER PUBLICATIONS

Curran, et al., "Pinpointing Users with Location Estimation Techniques and Wi-Fi Hotspot Technology," International Journal of Network Management, 2008, DOI: 10.1002/nem.683, 15 pages.

Griswold et al., "ActiveCampus—Sustaining Educational Communities through Mobile Technology." UCSD CSE Technical Report #CS200-0714, 2002, 19 pages.

Hazas, et al., "Location-Aware Computing Comes of Age," IEEE, vol. 37, Feb. 2004, pp. 95-97.

Hellebrandt, M., et al., "Estimating Position and Velocity of Mobile in a Cellular Radio Network," IEEE Transactions on Vehicular Technology, vol. 46, No. 1, Feb. 1997, pp. 65-71.

International Search Report and Written Opinion of the International Searching Authority, The United States Patent and Trademark Office, for International Application No. PCT/US2006/06041, dated Nov. 16, 2007, 4 pages.

International Search Report and Written Opinion of the International Searching Authority, The United States Patent and Trademark Office, for International Application No. PCT/US2011/029379, dated Jun. 1, 2011, 15 pages.

International Search Report and Written Opinion of the International Searching Authority, The United States Patent and Trademark Office, for International Application No. PCT/US2011/039717, dated Dec. 20, 2011; 13 pages.

International Search Report, International Application No. PCT/US05/39208, mailed Jan. 29, 2008, 3 pages.

International Search Report, International Application No. PCT/US07/62721, mailed Nov. 9, 2007. (3 pages).

Kim, M., et al., "Risks of using AP locations discovered through war driving," IEEE Transactions on Vehicular Technology, vol. 26, No. 1, Feb. 1997.

Kirsner, S., "One more way to find yourself," The Boston Globe, May 23, 2005, Retrieved from www.boston.com, 2 pages.

Krumm, J., et al., "LOCADIO: Inferring Motion and Location from WLAN Signal Strengths," Proc. of Mobiquitous, Aug. 22-26, 2004, 10 pages.

LaMarca, A., et al., "Place Lab: Device Positioning Using Radio Beacons in the Wild,"; Pervasive Computing, Oct. 2004, pp. 116-133.

LaMarca, A., et al., "Self-Mapping in 802.11 Location Systems," Ubicomp 2005: Ubiquitous Computing, Aug. 23, 2005, pp. 87-104.

Muthukrishnan, K., et al., "Towards Smart Surroundings: Enabling Techniques and Technologies for Localization," Lecture Notes in Computer Science, vol. 3479, May 2005, 11 pages.

Schilit, et al., "Challenge: Ubiquitous Location-Aware Computing and the "Place Lab" Initiative," WMASH'03, Sep. 2003, San Diego, CA, 7 pages.

Supplementary European Search Report for European Application No. 07757413, dated Apr. 6, 2010, 10 pages.

Zhou, R. "Wireless Indoor Tracking System (WITS)," Jul. 2006, retrieved on May 11, 2011 from the internet: <URLhttp://www.ks.uni-freiburg.de/assist/rui/index.php?page=publications>, entire document, 15 pages.

* cited by examiner

SYSTEM AND METHOD FOR ESTIMATING THE PROBABILITY OF MOVEMENT OF ACCESS POINTS IN A WLAN-BASED POSITIONING SYSTEM

CROSS-REFERENCE TO RELATED APPLICATIONS

This application is a continuation of and claims the benefit under 35 U.S.C. §120 of U.S. patent application Ser. No. 12/760,780, filed on Apr. 15, 2010, entitled System and Method for Estimating the Probability of Movement of Access Points in a WLAN-based Positioning System, which claims the benefit under 35 U.S.C. §119(e) of U.S. Provisional Patent Application No. 61/316,980, filed on Mar. 24, 2010, entitled System And Method For Resolving Multiple Location Estimate Conflicts In A WLAN-Positioning System, each of which is herein incorporated by reference in its entirety.

This application is related to the following U.S. patent applications, the contents of which are hereby incorporated by reference:

U.S. patent application Ser. No. 11/261,988, entitled Location-Based Services That Choose Location Algorithms Based On Number Of Detected Access Points Within Range Of User Device, filed on Oct. 28, 2005, now U.S. Pat. No. 7,305,245;

U.S. patent application Ser. No. 11/359,144, entitled Continuous Data Optimization Of New Access Points In Positioning Systems, filed on Feb. 22, 2006, now U.S. Pat. No. 7,493,127;

U.S. patent application Ser. No. 11/678,301, entitled Methods And Systems For Estimating A User Position In A WLAN Positioning System Based On User Assigned Access Point Locations, filed on Feb. 23, 2007, now U.S. Pat. No. 7,471,954;

U.S. patent application Ser. No. 11/625,450, entitled System and Method For Estimating Positioning Error Within A WLAN-Based Positioning System, filed on Jan. 22, 2007; and U.S. patent application Ser. No. 12/760,777, entitled System and Method for Resolving Multiple Location Estimate Conflicts in a WLAN-Positioning System, filed on Apr. 15, 2010.

BACKGROUND OF THE INVENTION

1. Field of the Invention

The invention generally relates to position estimates in a WLAN-based positioning system, and, more specifically, to estimating the probability that a position estimate is correct.

2. Description of Related Art

The U.S. patents and applications incorporated above and assigned to Skyhook Wireless, Inc. describe a Wi-Fi Positioning System (WPS) that uses the natural properties and widespread deployment of 802.11 access points (APs herein) to deliver precise positioning data to any Wi-Fi enabled device.

In such a WPS, APs provide a valuable method for determining the location of mobile wireless devices. Accurate knowledge of AP locations is essential to mobile location determination, and the relocation of APs poses a significant challenge to mobile location systems. For example, when a mobile device observes APs that have been relocated, its observations can conflict with stored AP location information and lead to location errors.

BRIEF SUMMARY OF THE INVENTION

Under one aspect of the invention, a method of and system for measuring and recovering from mobile location errors due to access point relocation is provided.

Under another aspect of the invention, a method of estimating the likelihood of a Wi-Fi enabled device being located within an estimated geographical area includes the Wi-Fi enabled device receiving signals transmitted by Wi-Fi access points in range of the Wi-Fi enabled device. The method also includes consulting a reference database to determine for each of at least one of the Wi-Fi access points from which signals were received a last-known estimated position of the Wi-Fi access point and time information associated with the last-known position for describing the age of the last-known position relative to other information in the reference database. The method further includes estimating, based on the last-known position, associated time information, and number of Wi-Fi access points from which signals were received the likelihood of the Wi-Fi enabled device being located within an estimated geographical area and displaying on a display device information based on the estimated likelihood of the Wi-Fi enabled device being located within the estimated geographical area.

Under another aspect of the invention, estimating the likelihood of the Wi-Fi enabled device being located within the estimated geographical area is further based on information that characterizes the probability that a Wi-Fi access points has moved from its corresponding last-known position. The probability is based on the relative age of said last-known position.

Under a further aspect of the invention, the method also includes estimating, based on the last-known position and associated time information, a plurality of likelihoods of the Wi-Fi enabled device being located within a corresponding plurality of estimated geographical areas and displaying on a display device information based on the plurality of estimated likelihoods of the Wi-Fi enabled device being located within the corresponding plurality of estimated geographical areas.

Under an aspect of the invention, the method also includes consulting an historical dataset to determine for at least one of the Wi-Fi access points from which signals were received information describing past relocations for said at least one Wi-Fi access point. The estimating the likelihood of the Wi-Fi enabled device being located within the estimated geographical area is further based on the information describing past relocations for the at least one Wi-Fi access point. Optionally, the information describing past relocations for the at least one Wi-Fi access point includes an average movement frequency for the at least one Wi-Fi access point. Optionally, the information describing past relocations for the at least one Wi-Fi access point includes an aggregate average movement frequency based on a collection of movement data for a plurality of Wi-Fi access points.

Under yet another aspect of the invention, a method of estimating the likelihood of a Wi-Fi enabled device being located within an estimated geographical area includes the Wi-Fi enabled device receiving signals transmitted by Wi-Fi access points in range of the Wi-Fi enabled device. The method also includes consulting a reference database to determine for each of a plurality of the Wi-Fi access points for which signals were received a last-known estimated position of the Wi-Fi access point and determining that at least a first set of the Wi-Fi access points for which signals were received have moved from their corresponding last-known estimated positions based on the last-known estimated positions for at least a second set of Wi-Fi access points for which signals were received. The method further includes estimating, based on the number of Wi-Fi access points of the first set and the number of Wi-Fi access points of the second set, the likelihood of the Wi-Fi enabled device being located within an estimated geographical area and displaying on a display device information based on the estimated likelihood of the Wi-Fi enabled device being located within the estimated geographical area.

Under a further aspect of the invention, the method also includes estimating, based on the number of Wi-Fi access points of the first set and the number of Wi-Fi access points of the second set, a plurality of likelihoods of the Wi-Fi enabled device being located within a corresponding plurality of estimated geographical areas and displaying on a display device information based on the plurality of estimated likelihoods of the Wi-Fi enabled device being located within the corresponding plurality of estimated geographical areas.

Under still another aspect of the invention, estimating the likelihood of the Wi-Fi enabled device being located within the estimated geographical area is further based on information that characterizes the probability that at least one of the Wi-Fi access points of the first set has moved from its corresponding last-known position, the probability being based on the number of Wi-Fi access points of the first set and the number of Wi-Fi access points of the second set.

Under another aspect of the invention, the method also includes consulting the reference database to determine for at least a first Wi-Fi access points from which signals were received a last-known estimated position of the first Wi-Fi access point and time information associated with the last-known position for describing the age of the last-known position relative to other information in the reference database. The estimating the likelihood of the Wi-Fi enabled device being located within an estimated geographical area being further based on the last-known position and associated time information of the first Wi-Fi access point.

Under a further aspect of the invention, a method of estimating the likelihood of a Wi-Fi enabled device being located within an estimated geographical area includes the Wi-Fi enabled device receiving signals transmitted by at least one Wi-Fi access point in range of the Wi-Fi enabled device. The method also includes extracting information from the signals received that identifies each of the at least one Wi-Fi access points from which signals were received and consulting a reference database to determine for at least one of the Wi-Fi access points from which signals were received a set of information identifying a corresponding set of Wi-Fi access points from which signals are expected to be received when the Wi-Fi enabled device receives signals from the at least one Wi-Fi access point of the plurality. The method further includes estimating the likelihood of the Wi-Fi enabled device being located within an estimated geographical area based on a comparison of the information identifying Wi-Fi access points from which signals were received and the set of information identifying the corresponding set of Wi-Fi access points from which signals are expected to be received and displaying on a display device information based on the estimated likelihood of the Wi-Fi enabled device being located within the estimated geographical area.

Under yet another aspect of the invention, a method of estimating the likelihood of a Wi-Fi enabled device being located within an estimated geographical area includes the Wi-Fi enabled device receiving signals transmitted by Wi-Fi access points in range of the Wi-Fi enabled device and extracting information from the signals received that identify each of a plurality of the Wi-Fi access points from which signals were received. The method also includes consulting a reference database to determine if the identity of each of the plurality of the identified Wi-Fi access points from which signals were received are present in the reference database. The method further includes estimating the likelihood of the Wi-Fi enabled device being located within an estimated geographical area based on the number of Wi-Fi access points from which signals were received and for which identities are present in the reference database, and displaying on a display device information based on the estimated likelihood of the Wi-Fi enabled device being located within the estimated geographical area.

DETAILED DESCRIPTION

Figure 1A:
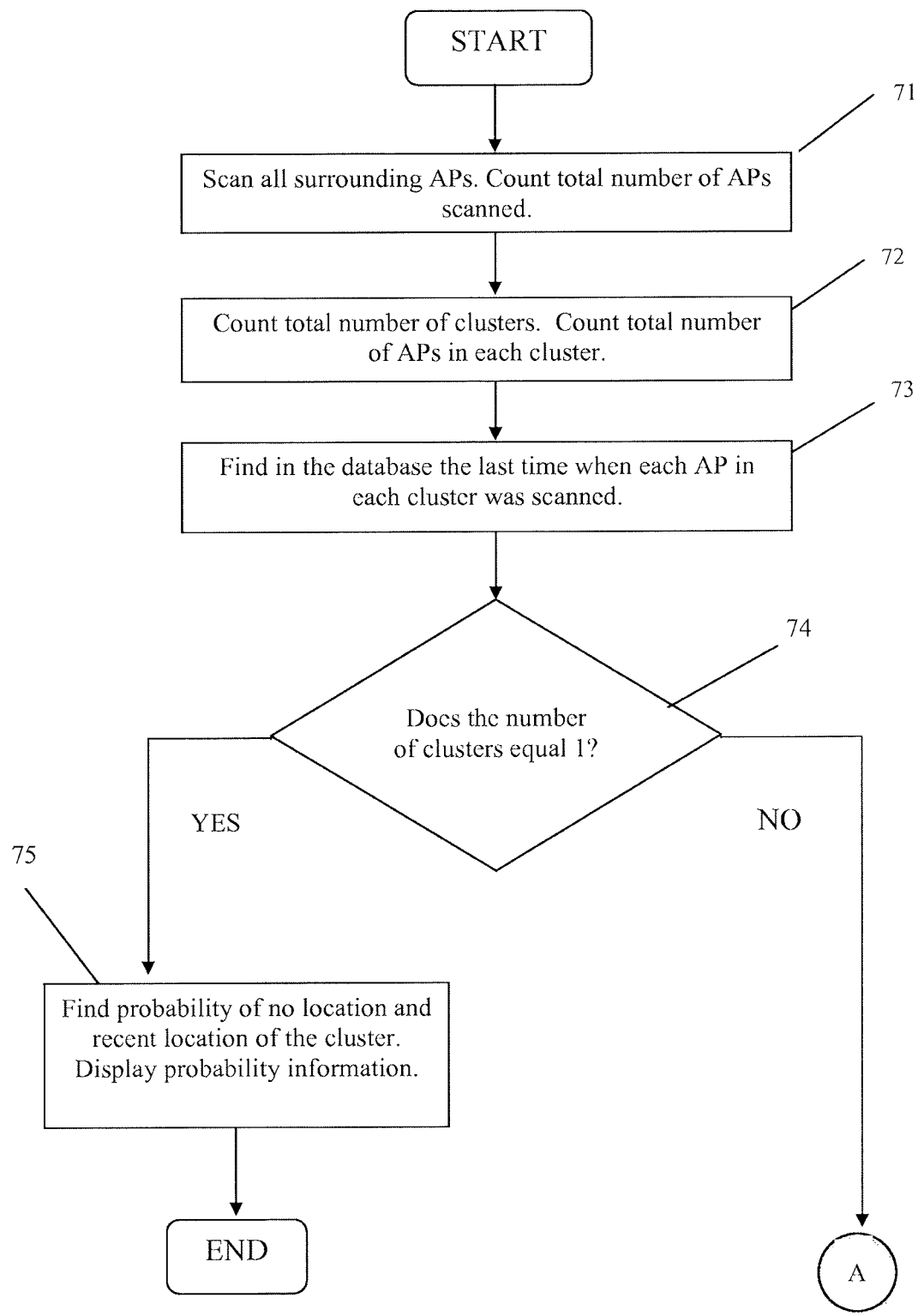
FIGS. 1A-B illustrate a method for calculating location estimates and center probabilities for a mobile device using a Wi-Fi Positioning System.

Preferred embodiments of the invention provide methods of and systems for measuring and recovering from mobile location errors due to Wi-Fi access point relocation. The embodiments described herein quantify the probability that a particular location estimate of a mobile device made by a WPS is correct to within an arbitrary accuracy. Implementations of the invention estimate the probability that one or more APs detected by the mobile device have relocated. In one illustrative example, the probability is estimated based on all or a subset of data present in the WPS that describes, in aggregate, the movement of many APs in the system. In another example, a system estimates such a probability upon determining that at least one of the APs observed by a mobile device has moved, such as, when location information associated with the observed APs is in conflict.

Certain embodiments of the invention build on techniques, systems and methods disclosed in the U.S. patents and applications incorporated above. The present techniques, however, are not limited to systems and methods disclosed in the incorporated patents and applications. Thus, while reference to such systems and applications may be helpful, it is not believed necessary to understand the present embodiments or inventions. For example, those applications taught specific ways to gather high quality location data for APs (also called "scan data") so that such data may be used to estimate the geographic location of a Wi-Fi-enabled device utilizing such services and techniques. By collecting location data repeatedly from the same location and recording the date of each scan event in a database, it is possible to observe the appearance and disappearance of APs over time. In some cases, appearing APs will be new devices that have not appeared in the database previously. Similarly, disappearing APs may be removed from service and never again appear in the database. Techniques to mitigate the negative effects of APs appearing and disappearing over time are addressed in other patent applications assigned to the assignee of the present application and are not discussed in detail herein. However, there is a third case in which an AP disappears from one location and appears in another location. The use of repeated scanning and maintenance of a time-indexed database of scan data facilitates the observation of AP movement.

The ability to track AP movement allows a reference database containing AP location information to be corrected to address obsolete AP location information, and tracking also produces valuable statistics that can be used to infer the movement of APs, even if they have not been scanned in their current locations. Mining the database yields empirical probability distributions on the frequency with which APs relocate and the associations between groups of APs that move together. These probability distributions are discussed in greater detail below.

Mobile location error is typically quantified using horizontal positioning error (HPE). Given a location estimate and an arbitrary probability threshold, HPE expresses the radius of a circle centered on the location estimate that is large enough to include the mobile's actual location with the desired probability. For instance, if a location technology is extremely accurate, it could be said that there is a 95% probability that the mobile's actual location is within 10 meters of a location estimate. For a less accurate system, the HPE might be 1000 meters for a 95% probability threshold.

Detecting and recovering from location errors caused by AP movement requires a means of quantifying the probability that stored AP location information is correct. To that end, implementations of the invention employ records of the age of information in the database and the associations between different APs. That is, relationships between APs that have been observed simultaneously to form groups, called clusters herein, are used to quantify the probability values. Further, a family, which is a cluster that relocates as a single group, can be used in the same way. In general, one would expect a family to be made up of APs that are owned by a single entity.

Figure 2:
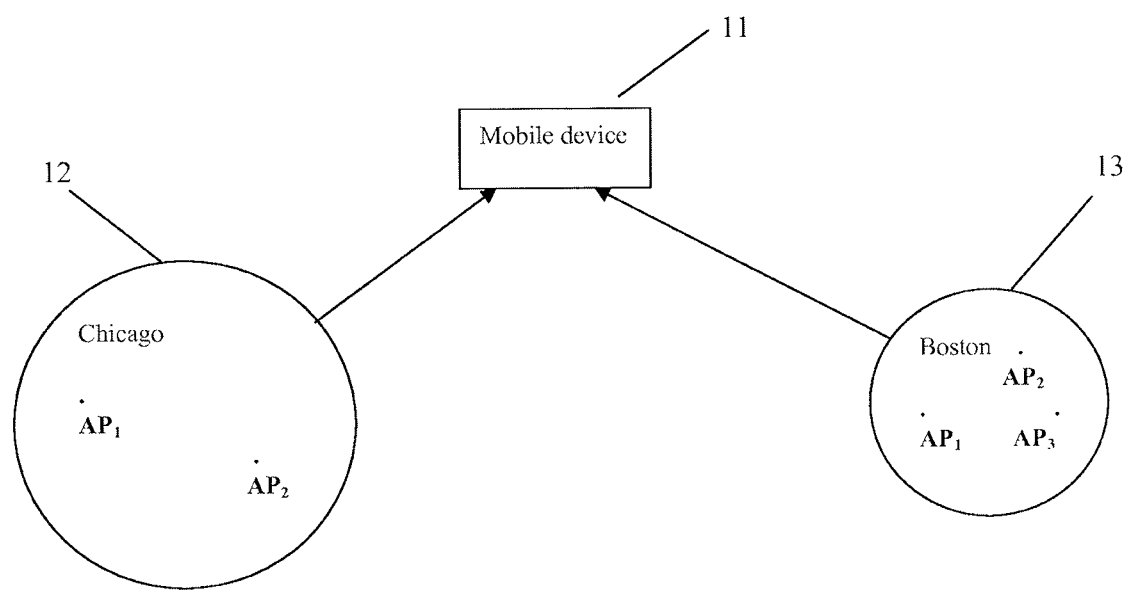
FIG. 2 shows a scenario in which a mobile device simultaneously observes APs from two discrete clusters.

FIG. 2 depicts a scenario in which a mobile device simultaneously observes APs from two discrete clusters. The database lists the 3 APs in the first cluster as residing in Boston, and 2 APs in the second cluster as residing in from Chicago. Since the transmission ranges of the APs is far smaller than the distance from Boston to Chicago, the database must contain incorrect information about at least one of the two clusters. In other words, both clusters are currently located in either Boston or Chicago, but the mobile cannot be absolutely certain which assumption is correct. As a result, the positioning algorithm assigns center probabilities to two separate location estimates, one in Boston and one in Chicago.

Even when the mobile observes only a single cluster of APs, there is some finite probability that the observed cluster is a family that has been relocated since the last time their location was confirmed. Thus, the center probability, P, applies to scenarios with any number of observed AP clusters.

In one implementation of the invention, a method is provided for calculating the center probability, P, using empirical data on the sizes of families of moved APs and the frequency with which families are relocated.

Figure 1B:
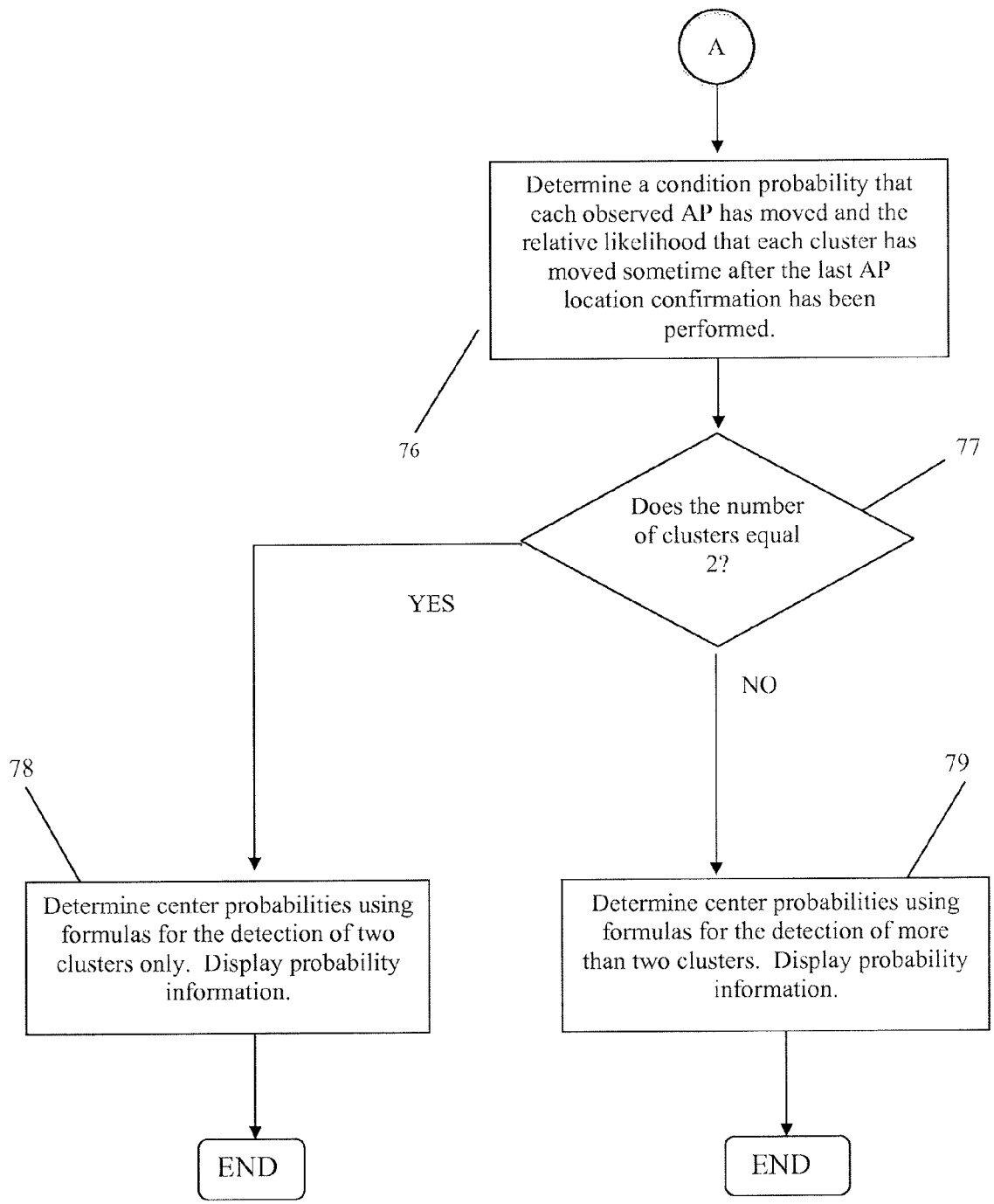

FIGS. 1A-B show a method for calculating location estimates and center probabilities in a variety of scenarios. First, the mobile device detects surrounding APs (step 71) and counts the total number of observed APs. Next, it consults the database to determine the number of separate clusters and the number of APs in each cluster (step 72). In other words, because the reference database has the coordinates of all scanned APs, it is able to separate the APs (or group of APs) that are far away from each other (when the distance between APs is larger than some large enough threshold). Each cluster is associated with the last time that it was observed by the scanner (i.e., the last time location information on the cluster was updated in the database containing the information about the location coordinates of all APs and last time an AP was observed by the scanner) (step 73). The term "scanner" as used herein describes a device that can detect Wi-Fi APs and also has a trusted and independent source of location information. For example, a scanner device may have both a Wi-Fi radio and a GPS system. Based on the number of clusters, the number of APs in each cluster, and the age of the information for each cluster, the invention determines center probability, P, values and other metrics as described in greater detail below.

For example, if only a single cluster is detected (at step 74), then the method determines the probability that the single cluster has moved sometime after the last confirmation of the location of the APs of the cluster has been performed. This is also called a "no location" probability herein. Meanwhile, if more than one cluster is detected, then a conditional probability of relocation for each of the APs is determined (step 76). That is, upon the condition of a conflict in location arising from the observation of APs (or clusters) that should not be detected simultaneously based on their last-known location, a probability that one of the APs (or clusters) has relocated is determined. In addition, the relative size of the clusters is compared with an empirical data set to determine the relative likelihood that each cluster of APs has moved sometime after the last confirmation of the location of the APs of the clusters has been performed (step 76). These techniques are set forth in more detail below.

Next, the method calls for determining the center probabilities for each detected cluster. As set forth in greater detail below, different formulas are used to determine these values depending on the number of clusters detected.

The method set forth above and shown in FIGS. 1A-B is described as having certain steps performed on a mobile device. While the initial search for APs within range of the mobile device is performed by the mobile device, any of the other steps can be performed on the mobile device or a remote computer system.

Probability of AP Movement

Given up-to-date knowledge of AP locations, the actual location of the mobile device is accurately modeled with a radially-symmetric probability distribution centered at the estimated mobile location (location center). However, when the validity of AP location information is uncertain due to AP relocation, the location estimation error can be quantified with two parameters. The first parameter is the radius about the location center within which the mobile resides with a given probability, conditioned on the fact that the location center is accurate to an arbitrary precision. The second parameter is the location center probability, P, which is accurate to an arbitrary precision.

Given a database of AP locations measured over time, we construct an approximation to the empirical cumulative distribution function (CDF) to describe the conditional probability that a single AP will have relocated within a specified time interval given that the AP has been moved (e.g., a conflict exists between locations of observed APs). Known methods may be used to approximate the CDF from the empirical dataset of AP that have moved. Because the database necessarily spans only a finite time interval, the CDF must saturate to probability 1 at the age of the oldest data. Thus, as more data is collected and the time spanned by the database increases, the CDF will be updated to reflect improved knowledge of the long-term relocation behavior of APs.

In one implementation of the invention, the CDF that a given AP will have relocated as a function of the time since it was last observed by the scanner is approximated. Time, t, is measured in units of months, and the approximation of the CDF is defined as Y(t), where $Y(t)=a$, if $0<t\leq h_0$, $Y(t)=bt+c$, if $h_0<t\leq h_1$, $Y(t)=1$, if $h_1<t$. (1a)

and a, b, c, $h_0$, $h_1$ are some constants, which are found empirically by analyzing the database of moved APs. One example of Y(t) is given by the formula $Y(t)=0.02$, if $0<t\leq 3$, $Y(t)=(2.51t-5.54)/100$, if $3<t\leq 42$, $Y(t)=1$, if $42<t$, (1)

which corresponds to step 76 of FIG. 1B.

The values of Y(t) represent a probability weight that the AP has been moved during the last t months, given that the last time it was scanned was t months ago, and given that the system has determined the AP is in a set of observed APs, one or more of which have moved.

Function (1) was determined by analyzing the database of moved APs. This database has all the information about moved APs, including the history of all locations of all detected moved APs and time of each AP being observed at each location.

As the database ages and contains a growing time series of scanned data, Y(t) is updated as follows:

$$Y(t) = \frac{84}{100(42+n)},$$ (2)

if $0 < t \leq 3$, $$Y(t) = \frac{41.16+n}{(39+n)(42+n)}t - \frac{2.16}{39+n},$$

if $3 < t \leq 42 + n$, $Y(t) = 1$, if $42 + n < t$.

where n=1, 2, 3, . . . represents the number of 6 month intervals since the first use of the function.

The conventional definition of HPE works well when the distribution of error in a location estimate is unimodal. Errors arising from noisy range estimation can be considered unimodal, but errors due to AP relocation are multimodal and not well quantified by HPE. For example, in a scenario in which a mobile observes two APs, one AP has correct location information in the database, but the other AP has been relocated from 100 kilometers away. The database has not been updated to reflect the relocation of the second AP, so it supplies the mobile with incorrect location information. If a single location estimate is constructed and a single circle drawn around it to express HPE, the radius will be on the order of 50 kilometers. However, if the underlying structure of the scenario is examined, it is seen that the location error is bimodal, and is better described with two circles, corresponding to each of the two APs. Each circle has its own HPE and center probability, P, which expresses the relative confidence in the information about each of the two APs in the database.

Clusters Of Equal Size

Figure 3:
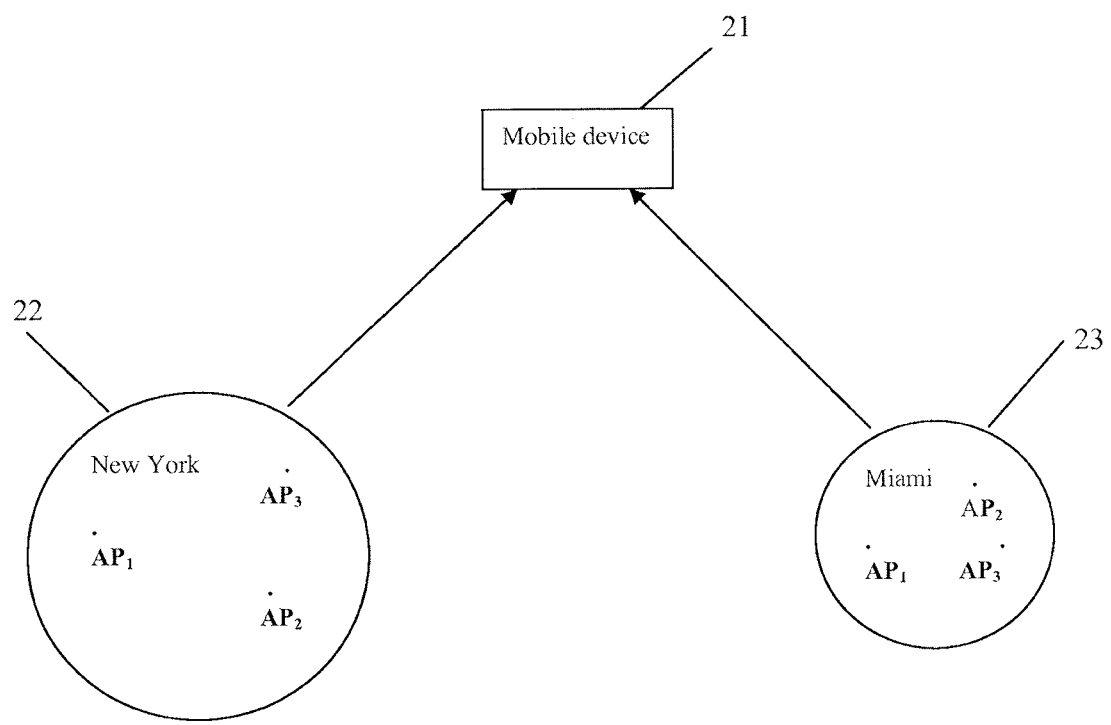
FIG. 3 shows an example in which a mobile device detects two clusters of equal size.

FIG. 3 shows an example in which the mobile device 21 detects two equal size clusters of APs: one cluster of 3 APs from New York 22 and one cluster of 3 APs from Miami 23. Note that a cluster might be as small as a single AP and has no upper limit on the number of members.

When a mobile device observes multiple APs whose locations as recorded in the database should preclude them from being observed simultaneously, the mobile device recognizes that one or more APs must have relocated. More generally, the mobile device may observe multiple clusters of APs, and one or more clusters may have relocated as a family unit. Because location estimation using any of the individual clusters would lead to disparate center locations, the mobile device must resolve the conflicting information in order to decide on a single location center.

Under one implementation, the conflicting location information is resolved by using the age of the newest information on each cluster. Function Y(t) shows that the probability of obsolescence of measurement information increases with the age of the measurement, so newer measurements are considered to be more reliable. Thus, the most effective method of choosing a location center is to assume that the cluster with the most recent measurement data has not relocated. Based on the difference in ages between the measurements of each cluster, the mobile device can then express its confidence in the chosen location center.

For example, consider the case where the mobile has observed two clusters of n APs. Each AP in each cluster is assigned an arbitrary index from 1 to n. The time since $AP_i$ of cluster 1 was last observed is denoted $t_i$, and the time since $AP_j$ of cluster 2 was last observed is $T_j$. The ratio, r, can be calculated as follows:

$\min(t_i)$=the smallest number among $t_1, t_2, \ldots, t_n$;

$\min(T_j)$=the smallest number among $T_1, T_2, \ldots, T_n$.

$$r = \frac{Y(\min(t_i))}{Y(\min(T_j))}$$

The parameter $P_1$ is assigned to the location estimate based on cluster 1 and probability parameter $P_2$ is assigned to the location estimate based on cluster 2. $P_1$ and $P_2$ are calculated according to the following equations (this corresponds to step 78 of FIG. 1B):

$$P_1 = \frac{1}{1+r}, \quad (3)$$

$$P_2 = \frac{r}{1+r}$$

In practice, there are several ways to apply $P_1$ and $P_2$. For example, only the location corresponding to the maximum center probability could be reported. Alternatively, a probability threshold could be set and a location only reported if one of the two center probabilities exceeds that threshold. If neither center probability exceeds the threshold (note that they are complementary and cannot both exceed 0.5 simultaneously), then the location estimate could be considered to be too unreliable, and a "no location" result reported. As a third possibility, both location estimates along with their associated center probabilities could be reported.

Cluster Movement

The sizes of observed clusters also affect the probability that the clusters have relocated. It has been discovered that small families are much more common than large families because there are a relatively small number of organizations that relocate with large numbers of APs. Thus, a large cluster is unlikely to be made up of a single family, and larger clusters are less likely to have been relocated.

Under another implementation of the invention, statistics based on the ratio of cluster sizes, a method for updating cluster information in the database, and a method for identifying and tracking families of APs as they relocate is described. As stated above, it is assumed that the scanning equipment used to compile the database possesses accurate location information independent of observed APs, so the database has high precision information regarding where and when each AP was observed. For example, the scanning equipment used to compile the database may use a GPS system to determine its position when detecting APs in a given geographical area.

For each scan in the database, any APs that have been observed simultaneously as belonging to the same cluster are identified during a scanning event to update and/or create the reference database. Then, whether any of the APs in the cluster have been relocated since the last time they were observed is also identified. If one or more APs have been relocated, previous observations are consulted to see if any of the relocated APs were moved as a family from their previous location(s). Taking the general definition that a family can be as small as one AP, each instance of family relocation is examined as follows. Each time a family relocates, the number of APs in the family and the number of APs not in the family is counted that combined to form the new cluster. That is, the number of relocated APs is compared to the number of APs that were not relocated. The notation $i \rightarrow j$ is used to represent the situation in which a family of $i$ relocated APs is observed at the same time as $j$ APs that have not been relocated since the last scan. In other words, the scanning device detected $i$ new APs and $j$ old APs at the same time and place.

Figure 4:
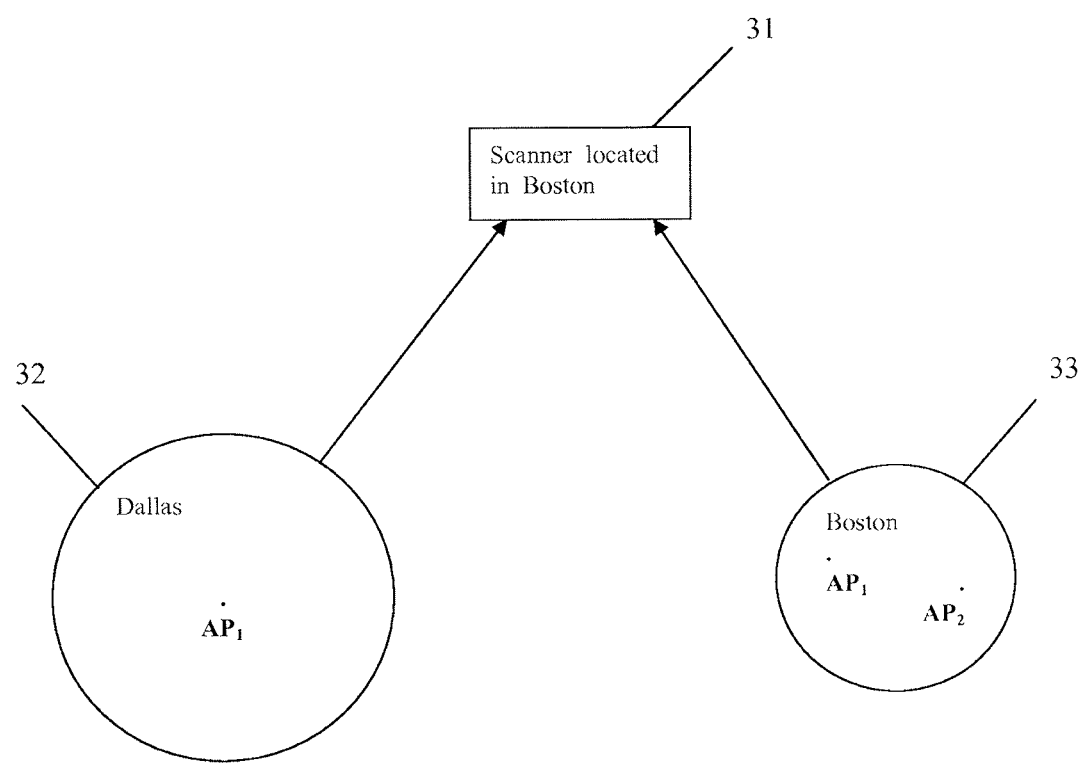
FIG. 4 shows an example in which an access point scanning device detects two clusters, one cluster having moved after the last location confirmation scan.

FIG. 4 shows an example in which a scanner located in Boston 31 observes 1 AP that has been moved from Dallas 32 and 2 APs that have remained, unmoved, in Boston 33 since the last time they were scanned. In this case, one pair $1 \rightarrow 2$ would be recorded.

Figure 5:
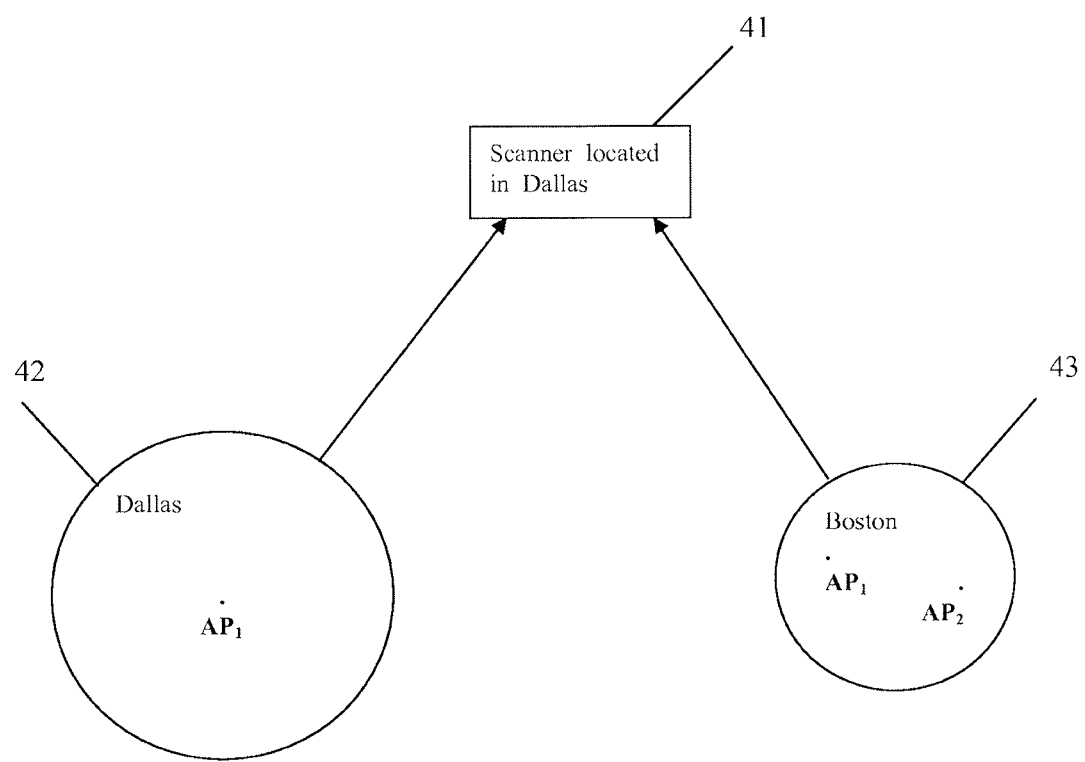
FIG. 5 shows an example in which an access point scanning device detects two clusters, one cluster having moved after the last location confirmation scan.

Referring to FIG. 5, if the same APs had been observed by a scanner in Dallas 41, then the scanner would conclude that the two APs from Boston 43 had been moved, and 1 AP from Dallas 42 remained, unmoved, and record $2 \rightarrow 1$.

After recording the total number of different pairs $i \rightarrow j$, parameter $K_{ij}$ is defined to describe the empirical probability that, given simultaneously observed clusters of size i and j with conflicting location information, the cluster of size i was relocated (for the case when $i \neq j$) (this corresponds to step 76 of FIG. 1B). Thus, $$K_{ij} = \frac{\text{number\_of\_pairs\_i} \rightarrow j}{\text{total\_number\_of\_pairs\_i} \rightarrow \text{j\_and\_j} \rightarrow i} \quad (4)$$

and vice versa, $$K_{ji} = \frac{\text{number\_of\_pairs\_j} \rightarrow i}{\text{total\_number\_of\_pairs\_i} \rightarrow \text{j\_and\_j} \rightarrow i}. \quad (5)$$

When $i=j$, $K_{ij}=\frac{1}{2}$. Therefore, $K_{ij}+K_{ji}=1$.

In order to keep the values of $K_{ij}$ as accurate as possible, it is preferred to recalculate them periodically to reflect new scan data.

Clusters of Equal Age

In another implementation, a method is described for assigning center probabilities to location estimates based on two clusters when one of the clusters has been relocated and database information on both clusters is of the same age. In this case, the cluster sizes are used to determine the probability that either of the two clusters was relocated as a family.

Figure 6:
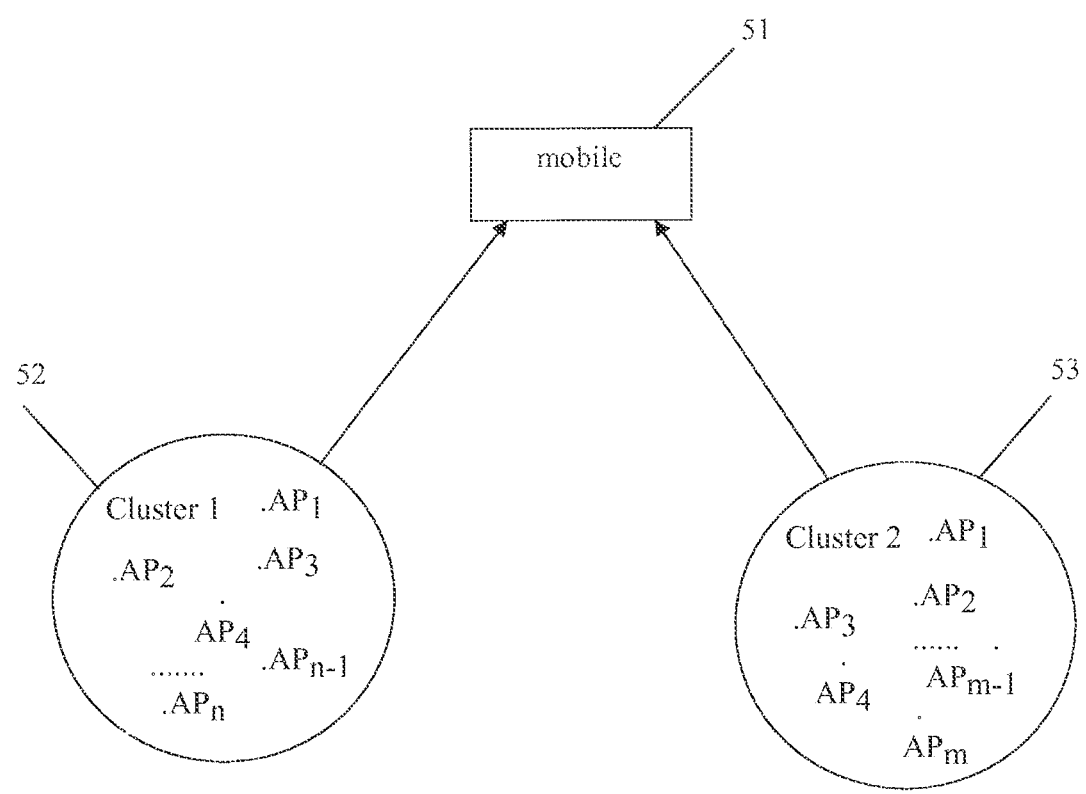
FIG. 6 shows an example in which a mobile device detects two clusters having differing numbers of access points.

FIG. 6 shows a scenario in which a first cluster 52 and a second cluster 53 are observed simultaneously by the mobile device 51, but the location information in the database indicates that the clusters are separated by a distance much greater than the transmission range of the APs. The first cluster consists of n APs and the second cluster consists of m APs. The positioning algorithm assigns center probabilities, $P_1$ and $P_2$, based on the most recent observation of each cluster.

It this illustrative example, it is assumed that the database information is of equal age for both clusters. Therefore, time does not play any role in the computation of the probabilities of the center location. The following definition for r is used:

$$r = \frac{K_{nm}}{(1 - K_{nm})}.$$

Center probability $P_1$ is associated with the location of the first cluster and center probability $P_2$ is associated with the location of the second cluster. The following formulas define $P_1$ and $P_2$ (this corresponds to step 78 of FIG. 1B):

$$P_1 = \frac{1}{1+r}, \quad (6)$$

$$P_2 = \frac{r}{1+r}$$

Clusters of Differing Sizes and Ages

In another embodiment of the invention, both cluster size and cluster age (the age of the most recent update on the cluster's location in the database) are used to assign center probabilities (this corresponds to step 78 of FIG. 1B).

Referring again to FIG. 6, the first cluster 52 is of size n, and the second cluster 53 is of size m. The time since AP j of the first cluster 52 was last observed is denoted $t_j$, and the time since AP k of the second cluster 53 was last observed is $T_k$. The values of $\min(t_i)$ and $\min(T_j)$ are determined as set forth above.

Next, the ratio, r, is determined using parameters based on both cluster size ratio, $K_{nm}$, and cluster age, Y, as follows:

$$r = \frac{K_{nm}Y(\min(t_i))}{(1-K_{nm})Y(\min(T_j))}$$

Once again, the center probabilities are as follows:

$$P_1 = \frac{1}{1+r}, \quad P_2 = \frac{r}{1+r} \qquad (7)$$

Movement of a Single Cluster

Under another implementation, a center probability is determined when the mobile device observes only a single cluster. In other words, if the mobile device finds only a single cluster of APs, there is some probability that the cluster has been relocated as a single family, and that possibility is quantified with a center probability.

Figure 7:
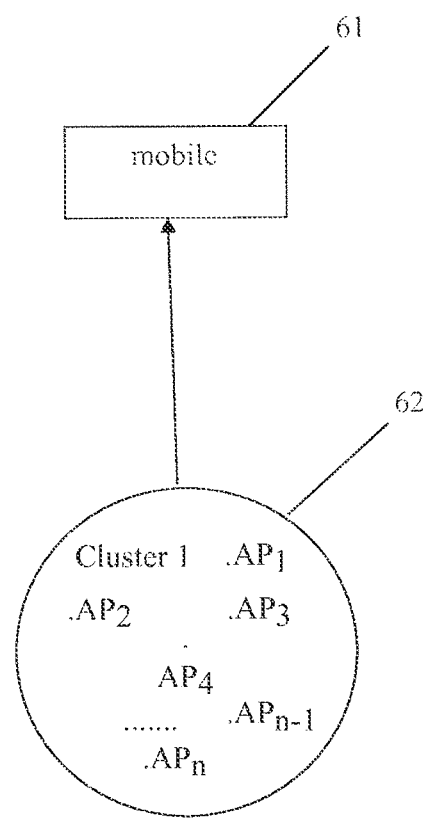
FIG. 7 shows an example in which a mobile device detects a single cluster.

FIG. 7 shows a situation in which the mobile device 61 has observed a single cluster 62 of n APs, and the last time the first AP in this cluster was updated was $t_1$ months ago. The second AP in this cluster was updated $t_2$ months ago, and the $n^{th}$ AP was updated $t_n$ months ago. As above, $\min(t_i)$=the smallest number among $t_1, t_2, \ldots, t_n$.

When a mobile device observes only a single cluster (i.e., there is no cluster conflict), the center probability is calculated as a function of following items: (1) the number of APs detected by the mobile device which are known in the database, (2) the number of APs detected by the mobile device which are not known and are not in the database, (3) other APs expected to neighbor a particular AP and the number of expected neighbors based on the collection of the history of observation of scanned results including that AP, (4) the minimum time elapsed from the last time that location of known APs is confirmed by a scanner, $\min(t_i)$, and (5) the confidence in the known location of individual APs that are in the database via a scanner detection. We can find, empirically, from the dataset of moved APs the probability of movement of an AP as a function of these parameters.

The above parameters are now discussed in more detail. A set of APs detected by a mobile device can be divided into two groups. The first group consists of APs that are present in the database by virtue of a scanner or derived from the locations of other known APs, whose locations are known with some degree of certainty. For example, when an unknown AP is scanned by the mobile device along with other known APs, then the position of the unknown AP can be estimated using a triangulation based on all known APs that are observed by the mobile device. The second group consists of APs that are new and have neither been located by a scanner nor derived from other known APs. Thus, some of the APs present in the database may be associated with a location that has been derived from other known APs. Therefore, center probability can be calculated as a function of number of known APs having locations.

Center probability can also be a function of the second group, which contains new APs that have been detected along-side of known APs that were not found by the scanner at the time of scanning. For example, assume a mobile device observes 2 known APs and 10 unknown APs, and the $\min(t_i)$ parameter of the cluster of the 2 known APs is equal to 1 year. Then, empirically, the probability that the cluster of 2 known APs has been relocated, as a family of APs, can be found from the data set of moved APs, given that the mobile device observed 2 known APs and 10 unknown APs, and the $\min(t_i)$ parameter of the cluster of the 2 known APs is equal to 1 year. Therefore, we can also find the empirical probability that cluster of 2 known APs has not moved.

Center probability can also be a function of expected neighbors of collective set of scanned APs. Based on the past history of observing a given AP with another set of APs at the time of systematic scanning and/or by detection of other mobile devices a set of expected neighbors is established for any known AP along with an expected number of neighbors. These measures are based on past observations and the density of APs in the neighborhood of the given AP. When a mobile device detects a set of APs, the probability that the observed cluster of APs has been moved can be determined based on consistency between the expected neighbors and what the mobile device observes. Probability that an AP has been moved, given a set of expected neighbors, expected number of neighbors, APs currently detected by the mobile, and number presently detected is determined empirically based on historical data gathered by, for example, scanners.

Center location can also be a function of time. In other words, the probability that an AP has been relocated can be determined as a function of time. For example, if an AP has been confirmed at a given location, the probability that the AP is still located in the same location after one day is higher than after one year.

Also, the certainty of an estimated location for a particular AP can be different. In other words, upon conducting a scanner survey of an area, the estimated location of an AP may be determined with a high confidence (e.g., 100%) or low confidence. Each AP that is found during a scanner pass is associated with a corresponding confidence. Center location probability can be a function of confidence in location of known APs. In one implementation, the confidence of all known APs detected by a mobile device can be estimated by taking the maximum confidence of all the detected APs.

The probability $P_{recent\_location}$ that a given cluster of n APs did not change its location can be estimated based on a collection of information on moved APs and moved families of APs (e.g., a "moved APs" database can contain information including previous and current location coordinates, the date a move was detected by a scanner, the size of families of APs which have been moved, etc.). Probability parameter $P_{recent\_location}$ depends on the cluster size n and time $\min(t_i)$. In other words, one can find from the moved APs database the following probability depending on two parameters:

$$P_{recent\_location} = P_{recent\_location}(n, \min(t_i)). \qquad (8)$$

Probability parameter $P_{no\_location}$ represents the probability that a given cluster of n APs has been moved to some other location, which has yet to be detected yet by a scanner. Thus, the "no location" subscript as used in this context represents the fact that an affirmative location cannot be provided until the cluster is detected by a scanner at some later time. Obviously, $$P_{no\_location} = 1 - P_{recent\_location} \qquad (9)$$

The potential measures of probabilities of center location as a function of the set of parameters given above (e.g., number of scanned APs that are known in the database, number of scanned APs that are not known and are not in the database, expected neighbors and expected number of neighbors based on scanned AP data, minimum time elapsed after the last time that the location of known scanned APs is confirmed, and confidence in the location of individual known scanned APs) can be found empirically from the moved APs information.

More than Two Clusters

In another implementation of the disclosed embodiment, the method for determining center probabilities is generalized to scenarios in which the mobile device detects X clusters of APs, where X can be greater than 2. The variable $w_n$ is the size of the $n^{th}$ cluster (n=1, 2, 3, . . . X), and $T_n$ is the age (measured in months) of the most recent scan of cluster n in the database. Ratio r is determined as follows:

$$r_{ij} = \frac{k_{w_i,w_j} Y(T_i)}{(1 - k_{w_i,w_j}) Y(T_j)}, (i, j = 1, 2, 3, \ldots, X; i \neq j)$$

where $k_{w_i,w_j}$ are K-values, Y is the function given by the formula (1). Next, $Q_n$ is defined as follows:

$$Q_n = \frac{1}{1 + r_{n,1}} \cdot \frac{1}{1 + r_{n,2}} \cdots \frac{1}{1 + r_{n,n-1}} \cdot \frac{1}{1 + r_{n,n+1}} \cdots \frac{1}{1 + r_{n,X}}$$

The following probabilities are associated with the location of $n^{th}$ cluster (this corresponds to step 79 of FIG. 1B):

$$P_n = \frac{Q_n}{\sum_{i=1}^{X} Q_i} \quad (10)$$

Influence of Environment and History of Particular AP Movement on Probabilities of Center Location.

Above, techniques for defining and estimating the probabilities of center locations of a mobile device were provided. These probabilities were based on an analysis of aggregate data, that is, a relatively large collection of location and movement data for relatively large number of APs. However, improvements to those estimates can be made using the APs environment and history of a given set of APs. For example, if it is known from the history of APs (which can be extracted from the moved APs database), that a particular AP relocates once per 6 months on average, and a second AP relocates once per 2 years on average, then this information is taken into account to improve the probabilities estimate. In other words, the variable "freq" representing the average movement frequency of a particular AP or cluster of APs may be taken into account. In such a case, instead of empirically estimated CDF approximation function Y(t) (formulas 1 and 2), an empirical estimate of the CDF approximation function Y(t, freq) is provided, where the joint probability distribution of random variables t and "freq" is considered, given that a particular AP (or cluster of APs) is determined to be within a set of detected APs, one or more of which have moved.

Another parameter that may affect the accuracy of the center probability estimate is the APs environment, or surrounding APs. For example, assume a first AP was detected in the recent past by mobile devices in conjunction with 10 other surrounding known APs on average. A mobile device now reports the observation of the first AP along with the detection of a second known AP, the location of which should preclude the two APs from being observed simultaneously. Assume also that the second known AP was previously scanned or observed without any other surrounding APs. Thus, at least one of the two APs has moved from its previously recorded location. This circumstance makes it is very likely that the first AP has been moved because, in addition to the conflicting location situation, the surrounding AP density changed substantially.

Considering another example, a third AP has been reported in the recent past by mobile devices with 5 known surrounding APs on average, and now a particular mobile device reports the third AP with 4 unknown surrounding APs. In this case, it is very likely that the third AP has been moved, because although the surrounding APs density has not changed substantially (4 versus 5), and no location conflict exists, the 4 presently detected APs are not the same, or a subset of the same, APs that are expected to be surrounding the third AP. The same would hold true were a location conflict to exist.

As one example of the use of an AP's environment parameter in adjusting its corresponding movement probability, a parameter, E, is provided that describes a change in APs surrounding density environment:

$$E = \frac{E_1 + 1}{E_2 + 1},$$

where $E_1$="recent average number of known APs detected along with given a given AP (or a given cluster of APs) by mobile devices" and $E_2$="current number of known APs detected along with a given AP (or a given cluster of APs) by mobile devices". Furthermore, a "density environment" function DE is as follows:

$$DE = \max(E, E^{-1}).$$

When $DE > C_1$, where $C_1$ is a threshold constant determined empirically (e.g., $C_1 = 4$), then the given AP (or given cluster of APs) is designed as having moved from its previous known location.

In general, all 3 parameters t, "freq" and DE can be combined in the estimation of center probability. Thus, instead of empirically estimated CDF approximation function Y(t) (formulas 1 and 2), an empirically estimated CDF approximation function Y(t, freq, DE) is provided where the joint probability distribution of random variables t, "freq" and DE are considered, given that an AP (or cluster of APs) is determined to be within a set of detected APs, one or more of which have moved.

In the case of single cluster observed by the mobile device, the empirically estimated parameter $P_{recent\_location}$ is provided as a function of cluster size n, time $\min(t_i)$, "freq", and DE as follows:

$$P_{recent\_location} = P_{recent\_location}(n, \min(t_i), \text{"freq"}, DE),$$

and $$P_{no\ location} = 1 - P_{recent\ location}.$$

Known-in-Advance Location Bias Correction

Above, the meaning and techniques for determining $K_{ij}$ parameters, or K-values were described. Those techniques relied on knowing the ground truth location during scanning. In other words, while scanning and recording all possible pairs i→j, a highly accurate geographical location was known. Typically, an accurate geographical location is only known when using GPS or some other reliable positioning technology.

However, there are some locations (e.g., indoors locations) when GPS or any other, typically accurate, positioning technology does not work or is not reliable. This means that it is possible that the location information for some APs in the reference database may be biased to certain known-in-advance locations, where a "known-in-advance" location is one that is known with a relatively high degree of accuracy. In certain implementations, it is desirable to ensure this bias does not affect the accuracy of the K-values for the entire distribution of all geographical locations of all possible AP observations. Note that the entire distribution consists of a first portion of data for which the geographical location was known with high precision during data collection and a second portion of the data for which the geographical location was not known or was inaccurate (e.g., locations where GPS does not work).

In such a case, a sufficiently large (e.g., on the order of 10,000 samples) number of AP observation samples containing the information about i→j pairs from the geographical locations where GPS location did not work can be selected. For each of the selected observations, an accurate geographical location can be determined using other means, and that location replaces the missing or inaccurate location information in the reference database. At this point, the updated data can then be reprocessed, as set forth in detail above. This will help to increase the diversity of the samples and reduce any potentially existing bias in the K-value estimations.

There may be instances in which there exist an insufficient number of samples having manually corrected location data to reduce potentially biased K-values as described above. However, it may still be desirable to reduce such bias. In such a case, unbiased K-values can be estimated from the known-in-advance scan locations statistics as set forth below.

The variable N is the total number of existing different families of APs in the known-in-advance possible scan population, and M is the total number of APs in the known-in-advance possible scan population. Proportion (weight) $w_1$ represents the proportion of all 1-size families of APs among N families, $w_2$ the proportion (weight) of all 2-size families of APs among N families, . . . , and $w_i$ the proportion (weight) of all i-size families of APs among N families. The variable L is the largest possible size of a family of APs that exists. The following holds true:

$$\sum_{i=1}^{L} w_i = 1 \quad (11)$$

and $$N = \frac{M}{\sum_{i=1}^{L} i w_i}. \quad (12)$$

The variable $p_i$ is the rate of movement of i-size families (i=1, 2, 3, . . . ). In other words, $$p_i = \frac{\text{number\_of\_moved\_during\_the\_year\_i-size\_families}}{\text{total\_number\_of\_i-size\_families}} \quad (13)$$

The variable $a_{ij}$ is the total collected number of i-size clusters vs. j-size clusters situations among the known-in-advance scan location data. For example, $a_{13}$ represents the total collected number of 1-size clusters vs. 3-size clusters, or, as defined above, the total number of 1→3 pairs plus the total number of 3→1 pairs. Given this, the total number of 1-size families that have been moved can be found. This number is determined as follows:

$$a_{11} + k_{12}a_{12} + k_{13}a_{13} + \ldots + k_{1L}a_{1L} = a_{11} + \sum_{i=2}^{L} k_{1i}a_{1i}$$

This value is also equal to $w_1 N p_1$. Thus, the following system of equations results:

$$a_{11} + k_{12}a_{12} + k_{13}a_{13} + \ldots + k_{1L}a_{1L} \ldots = w_1 N p_1 \quad (e_1)$$

$$a_{22} + (1 - k_{12})a_{12} + k_{23}a_{23} + \ldots + k_{2L}a_{2L} \ldots = w_2 N p_2 \quad (e_2)$$

$$a_{33} + (1 - k_{13})a_{13} + (1 - k_{23})a_{23} + \ldots + k_{3L}a_{3L} \ldots = w_3 N p_3 \quad (e_3)$$

$$\vdots$$

$$a_{LL} + (1 - k_{1L})a_{1L} + (1 - k_{2L})a_{2L} + \quad (e_{11})$$
$$\ldots + (1 - k_{L-1,L})a_{L-1,L} \ldots = w_L N p_L$$

Everything on the left-hand side of the system $(e_1)$-$(e_L)$ is known. Thus, the values for all of the ratios $$\frac{w_i p_i}{w_j p_j}$$

can be found. It is important to note that parameters $w_i$ and $p_i$ do not depend on whether only the known-in-advance locations scan population is taken into account, or whether the entire population (i.e., known location scans and unknown location observations) are taken into account.

Consider now the whole population of data from both known-in-advance and unknown locations. The variable $b_{ij}$ is the total collected number of i-size clusters vs. j-size clusters situations among the entire population of scan and observation data. For the sake of consistency, the notation $k_{ij}$ for the K-values, as used above for only locations known-in-advance, is retained in the description below for the entire population of data. However, it is noted that the K-values of the two scenarios are not necessarily equal because there may be bias of estimation of K-values to the known-in-advance scan population.

The variable $N_1$ is the total number of existing different families of APs if the entire population (i.e., known location scans and unknown location observations) is taken into account. Using logic similar to the description immediately above, the following system of equations results:

$$b_{11} + k_{12}b_{12} + k_{13}b_{13} + \ldots + k_{1L}b_{1L} \ldots = w_1 N_1 p_1 \quad (f_1)$$

$$b_{22} + (1 - k_{12})b_{12} + k_{23}b_{23} + \ldots + k_{2L}b_{2L} \ldots = w_2 N_1 p_2 \quad (f_2)$$

$$b_{33} + (1 - k_{13})b_{13} + (1 - k_{23})b_{23} + \ldots + k_{3L}b_{3L} \ldots = w_3 N_1 p_3 \quad (f_3)$$

$$\vdots$$

$$b_{LL} + (1 - k_{1L})b_{1L} + (1 - k_{2L})b_{2L} + \quad (f_L)$$
$$\ldots + (1 - k_{L-1,L})b_{L-1,L} \ldots = w_L N_1 p_L$$

In the above system of equations $(f_1)$-$(f_L)$, the parameters $k_{ij}$ must be estimated. The values of $b_{ij}$ are known because the information is derived from scan data, and all of the ratios $$\frac{w_i p_i}{w_j p_j}$$

are known, as provide above. Therefore, L independent equations exist and $$\frac{L(L-1)}{2}$$

variables $k_{ij}$ exist. The value of $$\frac{L(L-1)}{2} - L = \frac{L(L-3)}{2}$$

different $k_{ij}$ parameters, described immediately above, are obtained during scan data collection. These parameters are substituted in the system of equations $(f_1)$-$(f_L)$, in order to find the remaining L different $k_{ij}$ parameters.

Thus, the $k_{ij}$ parameters of the entire population of data (i.e., known and unknown locations) are estimated using a "smart guess" based on knowledge of some statistics of entire population (e.g., $b_{ij}$ values) and knowledge of some statistics (e.g., K-values) of known-in-advance scan location information. In other words, the $$\frac{L(L-3)}{2}$$

estimates of the $k_{ij}$ parameters, found as a solution to the system of equations $(e_1)$-$(e_L)$, are substituted into the system of equations $(f_1)$-$(f_L)$ to find the remaining L $k_{ij}$ parameters.

The techniques and systems disclosed herein may be implemented as a computer program product for use with a computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Moreover, the techniques and systems disclosed herein can be used with a variety of mobile devices. For example, mobile telephones, smart phones, personal digital assistants, satellite positioning units (e.g., GPS devices), and/or mobile computing devices capable of receiving the signals discussed herein can be used in implementations of the invention. The location estimate, corresponding expected error of the position estimate, and/or the probability values can be displayed on the mobile device and/or transmitted to other devices and/or computer systems. Further, it will be appreciated that the scope of the present invention is not limited to the above-described embodiments, but rather is defined by the appended claims; and that these claims will encompass modifications of and improvements to what has been described.

What is claimed is:

1. A method of estimating a likelihood of a Wi-Fi enabled device being located within an estimated geographical area, the method comprising:
    identifying at least one Wi-Fi access point in range of the Wi-Fi enabled device based on signals received by the Wi-Fi enabled device transmitted by the at least one Wi-Fi access point;
    consulting a reference database to determine for the at least one Wi-Fi access point from which signals were received a last-known position of the at least one Wi-Fi access point and time information associated with said last-known position for describing a most recent time when the at least one Wi-Fi access point was observed to be at the last-known position;
    estimating a geographical area in which the Wi-Fi enabled device may be located; and
    estimating the likelihood of the Wi-Fi enabled device being located within the estimated geographical area based on a probability that the at least one Wi-Fi access point has relocated, the probability that the at least one Wi-Fi access point has relocated based on at least one of:
        the most recent time when the at least one Wi-Fi access point was observed to be at the last-known position as indicated by the associated time information, or
        a number of the one or more Wi-Fi access points from which signals were received by the Wi-Fi enabled device,
    wherein the likelihood of the Wi-Fi enabled device being located within the estimated geographical area quantifies a probability that the estimate of the geographical area is correct.

2. The method of claim 1, wherein probability that the at least one Wi-Fi access point has relocated is based on the most recent time when the at least one Wi-Fi access point was observed to be at the last-known position.

3. The method of claim 2, further comprising determining information that characterizes a probability that a Wi-Fi access point has moved from its corresponding last-known position.

4. The method of claim 3, wherein the determining the information that characterizes the probability that the Wi-Fi access point has moved from its corresponding last-known position comprises:

determining a set of Wi-Fi access points, each Wi-Fi access point of the set located at a first geographic position for the corresponding Wi-Fi access point at a first point in time, and having moved to a second geographic position for the corresponding Wi-Fi access point at a second point in time; and based on the set of Wi-Fi access points that moved and based on the amount of time between the first and second points in time, determining information that characterizes the probability that the Wi-Fi access point has moved from its last-known position based on a most recent time when the Wi-Fi access point was observed to be at the last-known position.

5. The method of claim 1, further comprising:

consulting a historical dataset to determine for at least one of the Wi-Fi access points from which signals were received information describing past relocations for the at least one Wi-Fi access point;

wherein the probability that the at least one Wi-Fi access point has relocated is further based on the information describing past relocations for the at least one Wi-Fi access point.

6. The method of claim 5, wherein the information describing past relocations for the at least one Wi-Fi access point includes an average movement frequency for the at least one Wi-Fi access point.

7. The method of claim 5, wherein the information describing past relocations for the at least one Wi-Fi access point includes an aggregate average movement frequency based on a collection of movement data for a plurality of Wi-Fi access points.

8. The method of claim 1, further comprising displaying on a display device information based on the estimated likelihood of the Wi-Fi enabled device being located within the estimated geographical area.

9. A method of estimating a likelihood that a Wi-Fi enabled device is located within an estimated geographical area, the method comprising:

identifying at least one Wi-Fi access point in range of the Wi-Fi enabled device based on signals received by the Wi-Fi enabled device transmitted by the at least one Wi-Fi access point;

consulting a reference database to determine one or more clusters of one or more Wi-Fi access points from the identified at least one Wi-Fi access point, each cluster having a last-known position;

estimating a geographical area in which the Wi-Fi enabled device may be located based on a cluster of the one or more clusters;

estimating the likelihood that the Wi-Fi enabled device is located within the estimated geographical area, the likelihood estimated based on a probability that the cluster has relocated, the probability that the cluster has relocated based on at least one of:

a time when the cluster was last observed to be at the last-known position, or a cluster size indicating a number of Wi-Fi access points in the cluster, wherein the likelihood that the Wi-Fi enabled device is located within the estimated geographical area quantifies a probability that the estimate of the geographical area is correct.

10. The method of claim 9, wherein the probability that the estimate of the geographical area is correct is a center probability, and the geographical area is an area centered upon an estimated location having the center probability.

11. The method of claim 9, wherein the one or more clusters include a first cluster and a second cluster that have last-known positions separated by a distance greater than a transmission range of Wi-Fi access points, such that if Wi-Fi access points of both clusters are identified simultaneously by the Wi-Fi enabled device, then at least one last-known position must be incorrect.

12. The method of claim 9, wherein the probability that the cluster has relocated is based on the time when the cluster was last observed, and the estimating provides that a newer cluster with newer observations has a greater likelihood that the Wi-Fi enabled device is located within the estimated geographical area than an older cluster with older observations.

13. The method of claim 9, wherein the probability that the cluster has relocated is based on the cluster size, and the estimating provides that a larger cluster with more Wi-Fi access points has a greater likelihood that the Wi-Fi enabled device is located within the estimated geographical area than a smaller cluster with less Wi-Fi access points.

14. The method of claim 9, wherein the probability that the cluster has relocated is based on a combination of both the time when the cluster was last observed and the cluster size.

15. The method of claim 9, wherein the probability that the cluster has relocated is further based on a number of the one or more clusters.

16. The method of claim 9, wherein the probability that the cluster has relocated is further based on a historical dataset that includes information describing past relocations of at least one Wi-Fi access point in the cluster.

17. The method of claim 16, wherein the information describing past relocations includes an average movement frequency.

18. The method of claim 9, wherein the probability that the cluster has relocated is further based on a number of Wi-Fi accesses points surrounding at least one Wi-Fi access point in the cluster.

19. A system comprising:

a Wi-Fi enabled device configured to identify a plurality of Wi-Fi access points in range of the Wi-Fi enabled device; and a non-transitory computer readable medium storing program instructions that when executed on the Wi-Fi enabled device or on a server, are operable to:

consult a reference database to determine one or more clusters of one or more Wi-Fi access points from the identified plurality of Wi-Fi access points, each cluster having a last-known position, and estimate a likelihood that the Wi-Fi enabled device is located within an estimated geographical area based on a probability that a cluster of the one or more clusters has relocated, the probability estimated based on at least one of:

a time when the cluster was last observed to be at the last-known position, or a cluster size indicating a number of Wi-Fi access points in the cluster, wherein the likelihood that the Wi-Fi enabled device is located within the estimated geographical area quantifies a probability that the estimate of the geographical area is correct.

20. The system of claim 19, wherein the probability that the estimate of the geographical area is correct is a center probability, and the geographical area is an area centered upon an estimated location having the center probability.

* * * * *